United States Patent
Duffe et al.

(10) Patent No.: US 12,351,015 B2
(45) Date of Patent: Jul. 8, 2025

(54) HEAT EXCHANGER ASSEMBLY FOR A MOTOR VEHICLE

(71) Applicant: Ford Global Technologies, LLC, Dearborn, MI (US)

(72) Inventors: Tobias Duffe, Cologne (DE); Maximilian Klein, Düsseldorf (DE); Christian Jolk, Cologne (DE); Morten Pyroth, Leverkusen (DE); Thomas Nitsche, Neuss (DE)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 18/315,108

(22) Filed: May 10, 2023

(65) Prior Publication Data

US 2023/0364983 A1 Nov. 16, 2023

(30) Foreign Application Priority Data

May 10, 2022 (DE) .......................... 102022111588.7

(51) Int. Cl.
*B60K 11/04* (2006.01)
*B33Y 80/00* (2015.01)
*F28D 21/00* (2006.01)

(52) U.S. Cl.
CPC .............. *B60K 11/04* (2013.01); *F28D 21/00* (2013.01); *B33Y 80/00* (2014.12); *F28D 2021/008* (2013.01)

(58) Field of Classification Search
CPC ... B60K 11/04; F28D 21/00; F28D 2021/008; B33Y 80/00; B62D 25/084; B62D 25/085

USPC ........................................................ 165/143
See application file for complete search history.

(56) References Cited

U.S. PATENT DOCUMENTS

| | | | |
|---|---|---|---|
| 8,845,128 B2 * | 9/2014 | Pickholz ................ | B60Q 1/045 |
| | | | 362/547 |
| 11,014,440 B2 | 5/2021 | Glickman et al. | |
| 11,591,028 B2 * | 2/2023 | Menez Sánchez .. | B62D 25/085 |
| 11,602,985 B2 * | 3/2023 | Weston .............. | B60H 1/00042 |
| 2003/0168270 A1 * | 9/2003 | Maeda ................. | B62D 25/084 |
| | | | 180/68.4 |
| 2018/0038651 A1 * | 2/2018 | Tonellato .............. | F28F 9/0221 |
| 2018/0119762 A1 * | 5/2018 | Smith .................... | F16D 65/847 |
| 2018/0347909 A1 * | 12/2018 | Shimota ................. | B60K 11/04 |
| 2019/0393576 A1 | 12/2019 | Sunada et al. | |
| 2021/0070131 A1 | 3/2021 | Weston et al. | |

FOREIGN PATENT DOCUMENTS

| | | |
|---|---|---|
| EP | 3742098 | 5/2021 |
| KR | 1020210023143 | 3/2021 |

* cited by examiner

*Primary Examiner* — Jon T. Schermerhorn, Jr.
(74) *Attorney, Agent, or Firm* — Burris Law, PLLC

(57) ABSTRACT

A heat exchanger assembly for a motor vehicle includes a heat exchanger formed by additive manufacturing. The heat exchanger includes two end tanks and a plurality of exchanger tubes. The plurality of exchanger tubes extend in a transverse direction relative to a longitudinal direction of the motor vehicle and connects the two end tanks to each other such that fluid is allowed to flow between the two end tanks by the plurality of exchanger tubes. The heat exchanger has a recess formed therein. A first exchanger tube of the plurality of exchanger tubes has at least one change of direction such that the first exchanger tube bypasses the recess at an angle to the transverse direction and runs along a side of the recess.

20 Claims, 10 Drawing Sheets

HEAT EXCHANGER ASSEMBLY FOR A MOTOR VEHICLE

CROSS-REFERENCE TO RELATED APPLICATION

This application claims priority to and the benefit of German Patent Application No. 102022111588.7, filed on May 10, 2022. The disclosure of the above application is incorporated herein by reference.

FIELD

The present disclosure relates to a heat exchanger assembly for a motor vehicle.

BACKGROUND

The statements in this section merely provide background information related to the present disclosure and may not constitute prior art.

Heat exchangers are employed in motor vehicles such as cars or trucks as part of cooling circuits or refrigerant circuits which are in turn required for cooling motor vehicle components such as the motor, gearbox, etc or for air-conditioning a vehicle interior. Some of these cooling circuits use a continuously liquid heat exchanger medium or fluid which absorbs the heat from the motor vehicle components and discharges it to the ambient air at the heat exchanger, normally a radiator installed in the front part of the motor vehicle. In other cases, the fluid enters the heat exchanger in a gaseous state, condenses in the heat exchanger, and is cooled, and leaves the heat exchanger in a liquid state. The reverse situation is also conceivable where the fluid enters the heat exchanger in a liquid state, is heated there, evaporates, and leaves the heat exchanger as a gas. The heat exchanger thus serves as an evaporator which extracts heat from the ambient air and can be used, according to the principle of a heat pump, to heat a vehicle interior.

Often a plurality of heat exchangers which are associated with different heating circuits are arranged in the front region of the vehicle. They can be grouped together as a unit in a heat exchanger bundle which can additionally also have a fan together with a bracket and holding and insulating components. According to a usual structure, a heat exchanger has an inlet tank which is connected to an outlet tank by an exchanger core. The exchanger core generally consists of a plurality of spaced-apart exchanger tubes which are largely responsible for the heat exchange between the fluid and the ambient air. The elements are conventionally, for example, cut off from prefabricated tubes, possibly shaped to a limited extent, and joined together. This normally allows an approximately rectangular shape of the heat exchanger. However, because of the limited structural space, such a shape causes problems as it is often difficult to integrate and can also make it harder to bring together a plurality of heat exchangers to form a bundle.

U.S. Pub. No. 2021/0070131 A1 discloses a cooling unit for a vehicle which comprises a non-rectangular radiator which is positioned in a front end of the vehicle, an inlet duct which is continuous with the radiator and is arranged upstream from the radiator, and an outlet duct which is arranged so that it is likewise continuous with the radiator and downstream from the non-rectangular radiator. The non-rectangular radiator, the inlet duct, and the outlet duct form a continuous monolithic structure and can be produced by additive manufacturing.

U.S. Pat. No. 11,014,440 B2 discloses a structural cooling unit for a vehicle which comprises a housing which defines a first pocket between a front side and a rear side, wherein the housing comprises an individual integrated part which comprises a fluid reservoir portion, a vane portion, a fan shroud portion, a bolster portion, and at least one mounting portion which is mountable to a frame of a vehicle. The housing is formed as a single integral part from a plastic material which contains fiber-reinforced material. A condenser is mounted inside the first pocket. A fan unit is mounted inside the fan housing portion, and a car radiator is mounted on the rear side.

EP 3742098 B1 discloses a heat exchanger which has a plurality of tubes which extend between two head portions, wherein the head portions are connected to an inlet chamber and an outlet chamber which are connected to each other by the tubes. All the tubes are produced as a single piece by additive manufacturing and each tube extends in each case in a sinusoidal path in order to enlarge the surface for heat exchange between the first fluid and the second fluid without any fins being necessary between the tubes.

KR 20210023143 A shows a front module for a vehicle which comprises a bracket which is arranged in front of the vehicle, a cooling module which is attached to the bracket, a bumper bracket which is arranged in front of the bracket and the cooling module, and an air guide which is coupled to the bracket and is arranged between the cooling module and the bumper beam. The structure of the air guide prevents air which is introduced in the direction of the cooling module from escaping between the air guide and the cooling module or between the air guide and the bumper beam.

U.S. Pub. No. 2019/0393576 A1 discloses a heat management system for batteries, with a non-porous inner wall which defines a battery storage compartment, wherein the non-porous inner wall is configured such that it touches at least a part of a battery cell which is held and conducts heat to or from the battery cell. A cavity which is arranged so that it adjoins the non-porous inner wall in a direction away from the at least one battery cell, and a non-porous outer wall which is arranged so that it adjoins the cavity. A working fluid is arranged In the cavity and a heat-transfer plate is in thermal contact on a first side with the working fluid and on a second side with a cooling or heating environment. The battery storage compartment, including the non-porous inner and outer wall, and the heat-transfer plate are designed as a single continuous monolithic structure.

SUMMARY

This section provides a general summary of the disclosure and is not a comprehensive disclosure of its full scope or all of its features.

In one form, the present disclosure provides a heat exchanger assembly for a motor vehicle. The heat exchanger assembly includes at least one heat exchanger formed by additive manufacturing and including at least two end tanks and a plurality of exchanger tubes formed therein. The plurality of exchanger tubes extend in a transverse direction relative to a longitudinal direction of the motor vehicle and connect the two end tanks to each other such that fluid is allowed to flow between the two end tanks by the plurality of exchanger tubes. The heat exchanger has a first recess formed therein. A first exchanger tube of the plurality of exchanger tubes has at least one change of direction such that the first exchanger tube bypasses the first recess at an angle to the transverse direction and runs along a side of the first recess.

In variations of the heat exchanger assembly of the above paragraph, which can be implemented individually or in any combination: a vehicle component is at least partially received in the first recess; the vehicle component is an engine hood lock; the at least one heat exchanger has a second recess formed therein and the plurality of exchanger tubes includes a second exchanger tube that has at least one change of direction such that the second exchanger tube bypasses the second recess at an angle to the transverse direction; the first exchanger tube runs up to a second exchanger tube of the plurality of exchanger tubes and merges with the second exchanger tube in the area of the first recess; the first exchanger tube bypasses a second exchanger tube of the plurality of exchanger tubes in the longitudinal direction; the first exchanger tube is located above the second exchanger tube; the second exchanger tube extends continuously in the transverse direction; contours of each of the two end tanks and at least one exchanger tube of the plurality of exchanger tubes transition into each other in a curve; and the heat exchanger includes at least two heat exchangers which are connected by at least one additively manufactured, thermally insulating connecting element to form a heat exchanger bundle.

In another form, the present disclosure provides a heat exchanger assembly for a motor vehicle. The heat exchanger assembly includes at least one heat exchanger formed by additive manufacturing and including two end tanks and a plurality of exchanger tubes. The plurality of exchanger tubes extend in a transverse direction relative to a longitudinal direction of the motor vehicle and connect the two end tanks to each other such that fluid is allowed to flow between the two end tanks by the plurality of exchanger tubes. The heat exchanger has a first recess and a second recess formed therein. A first exchanger tube of the plurality of exchanger tubes extends along the transverse direction and has at least one change of direction such that the first exchanger tube bypasses the first recess at a first angle to the transverse direction and runs along a first side of the first recess. One end tank of the two end tanks extends along a vertical direction of the motor vehicle and has at least one change of direction such that the one end tank bypasses the second recess at a second angle to the vertical direction and runs along a second side of the second recess.

In variations of the heat exchanger assembly of the above paragraph, which can be implemented individually or in any combination: a vehicle component at least partially received in the first recess; the vehicle component is an engine hood lock; a vehicle component at least partially received in the second recess; the vehicle component is a bumper; the first exchanger tube runs up to a second exchanger tube of the plurality of exchanger tubes and merges with the second exchanger tube in the area of the first recess; the first exchanger tube bypasses a second exchanger tube of the plurality of exchanger tubes in the longitudinal direction; the first exchanger tube is located above the second exchanger tube; the second exchanger tube extends continuously in the transverse direction; and the heat exchanger includes at least two heat exchangers which are connected by at least one additively manufactured, thermally insulating connecting element to form a heat exchanger bundle.

It should be noted that the features specified individually in the following description can be combined with one another in any desired technically meaningful way and disclose further forms of the disclosure. The description additionally specifies the disclosure, in particular in conjunction with the figures.

The disclosure provides a heat exchanger assembly for a motor vehicle which has at least one heat exchanger. The heat exchanger can also be referred to as a radiator and is generally a front radiator, i.e., a radiator or heat exchanger which is installed in the front area of the motor vehicle. In particular, the motor vehicle can be a road vehicle such as a car, bus, or truck, for example. The heat exchanger assembly can, depending on the form, consist solely of the heat exchanger or it can have further elements which can have a functional and/or spatial relationship with the heat exchanger. Once installed, the heat exchanger is a constituent part of a heat circuit of the motor vehicle, wherein the term "heat circuit" here includes both cooling circuits, in which a continuously liquid fluid is used for the purpose of heat transport, and refrigerant circuits, in which the refrigerant is liquefied or evaporated in the heat exchanger, as in the case of a heat pump.

The heat exchanger has at least two end tanks which can also be referred to as an inlet tank and an outlet tank. The end tanks serve to hold a fluid which serves for transporting heat within the abovementioned heat circuit. The term fluid includes within the sense of the disclosure any heat or cold exchange medium. The fluid inside the motor vehicle generally absorbs heat, for example from an engine of the motor vehicle, and discharges heat in the heat exchanger, wherein in the case of heat pump mode absorbing heat in the heat exchanger and discharging heat inside the motor vehicle are also possible. The fluid can be continuously liquid but can also be at least partially gaseous, wherein at least partial liquefaction or evaporation can take place in the heat exchanger. An end tank (the inlet tank) forms a part of the heat exchanger which is arranged upstream in the heat circuit, whilst another end tank (the outlet tank) forms a part arranged downstream, i.e., the fluid enters the heat exchanger at the inlet tank and leaves it at the outlet tank. In some heat circuits, a deflection of the flow direction can be produced by valves such that, depending on the operating mode, the "inlet tank" can be situated downstream of the "outlet tank". In one form, one inlet tank and one outlet tank are provided but there could also be a plurality inlet tanks and/or a plurality of outlet tanks. The geometry of the respective end tank is not limited within the scope of the disclosure but an end tank can extend, for example, in an elongated and/or column-like fashion on one side of the heat exchanger. The cross-section of the respective end tank can be designed so that it is, for example, circular, elliptical, polygonal (in particular rectangular), polygonal with rounded corners, or otherwise.

The end tanks are connected to each other by a plurality of exchanger tubes of an exchanger core extending transversely to a longitudinal axis, along a transverse axis, and along a vertical axis. Instead of an exchanger tube, it could also be referred to as an exchanger pipe or the like. The respective exchanger tube serves to guide the fluid from one end tank (inlet tank) to another end tank (outlet tank). Accordingly, it has a continuous fluid passage path between the end tanks. It can be formed by a fluid duct but it would also be conceivable that an exchanger tube has a plurality of fluid ducts separated from one another. The cross-section of the fluid passage path and the cross-section of the exchanger tube can as a whole be configured differently, for example circularly, elliptically, polygonally (in particular rectangularly), polygonally with rounded corners, etc.

It should be understood that each fluid duct is connected to the inside of two end tanks (inlet tank and outlet tank), whilst the respective exchanger tube is connected fluid tightly to the end tanks such that no fluid can escape at the transition. The end tanks can be manufactured from metal or from plastic (e.g., reinforced plastic). The exchanger tubes are preferably manufactured from metal (e.g., aluminum or an aluminum alloy) in order to provide sufficient thermal conductivity but manufacture from other materials is also possible, for example plastic or a composite material. The exchanger tubes are part of an exchanger core which extends transversely to the longitudinal axis (X-axis), along the transverse axis (Y-axis), and along the vertical axis (Z-axis) but it is also possible to say along a transverse plane spanned by the transverse axis and the vertical axis. Although the exchanger core extends along the transverse plane, this does not mean that the exchanger core as a whole or individual exchanger tubes have to run parallel to the transverse plane. In one form, the extent of the exchanger core along the longitudinal axis (X-axis) is substantially smaller than along the transverse axis or the vertical axis. The longitudinal axis, transverse axis, and vertical axis are perpendicular to one another in pairs. In principle, these terms are not to be interpreted as limiting. However, the axes usually correspond to the motor vehicle longitudinal axis, transverse axis, and vertical axis with respect to the properly installed state of the heat exchanger assembly.

The exchanger core is desired for the heat exchange function because it has a large surface in relation to the volume of the guided fluid. A continuous air passage path for ambient air along the longitudinal axis is formed here between adjacent exchanger tubes. The adjacent exchanger tubes thus do not directly adjoin one another, or not everywhere, and instead are spaced apart at least in some areas in such a way that the air passage path is formed between them. In one form, at least one such air passage path is formed between each pair of adjacent exchanger tubes, although it would be possible within the scope of the disclosure that adjacent exchanger tubes adjoin one another without any gaps or passages therebetween. While the ambient air traverses the air passage path, heat exchange between it and the surfaces of the exchanger core occurs, whereby indirect heat exchange takes place between the ambient air and the fluid.

The end tanks and the exchanger tubes are here manufactured additively and form fluid-guiding elements. These elements serve to guide or hold the fluid such that the term "fluid-guiding elements" is used below as an umbrella term for the end tanks and the exchanger tubes. They are manufactured additively, i.e., an additive manufacturing method is thus employed (i.e., 3D printing). The method here is generally one in which, based on construction data, a component is produced from shapeless or shape-neutral materials such as powders (possibly with the addition of a binder) or liquids (which also includes temporarily molten solids), in this case therefore the fluid-guiding elements. These processes are also known under collective terms such as "rapid prototyping," "rapid manufacturing", or "rapid tooling."

If these elements are produced from metal, a powder bed method such as selective laser sintering (SLS) or selective laser melting (SLM) can be considered, wherein a powder is applied and then selectively heated and sintered or melted by means of suitable focussed radiation. In other words, the component is built up successively from parallel layers. In addition, methods can also be considered in which a metal is applied in liquid form and then solidified. In this way, a metal object can be built up successively, wherein the building-up can likewise be effected in layers. The metal can be supplied in the form of strands or wires and melted before it is applied locally in dots as it were. Individual drops of the metal can thus be generated and be ejected through a nozzle under pressure in the manner of a jet printer. The nozzle is directed at the desired application point at which the respective drop subsequently hardens. Such a method can be classified as liquid metal printing. In contrast to powder bed methods, complete layers of powder do not need to be applied and instead targeted application at the points which correspond to the object to be manufactured is sufficient. The respective layers can have a plane form and run horizontally (i.e., perpendicularly to the direction of gravity) but non-plane layers are also possible, as are layers which are inclined to the horizontal. An applied layer can be formed as flat ("two-dimensional"), linear ("one-dimensional"), or even dots ("zero-dimensional").

In both powder bed methods and liquid metal printing, the layers are applied one after the other to a base, i.e., a first layer is applied directly to the base, after which the further layers are applied successively one on top of the other. The base is typically designed as a build platform or base platform which generally has a plane surface to which the first metal layer is applied.

The fluid-guiding elements are manufactured additively, which in principle includes the possibility that, for example, the end tanks and the exchanger tubes of the exchanger core are manufactured separately from one another and then connected. In one form, all the fluid-guiding elements are manufactured additively as a single piece with one another, i.e., in a single additive manufacturing process. The statement that the fluid-guiding elements are manufactured additively does not exclude that non-additive methods are used for the final completion, for example material-removing methods or separating methods. For example, the additively manufactured object can be composed as a whole, on the one hand, by a portion (fluid-guiding elements) which can be used later and, on the other hand, by connecting structures or support structures which connect the usable portion to the base. These connecting structures can serve, on the one hand, to mechanically support the object during the manufacture and, on the other hand, to dissipate the heat from the object into the base. After the additive manufacturing has ended, the connecting structures should be removed, for example by machining. In addition, in the case of powder bed methods, powder which may still adhere to the object or remain in depressions after the additive manufacturing can be blown out, washed out, or for example removed mechanically.

According to the present disclosure, at least one heat exchanger has a recess which extends in a limited fashion along a first axis, wherein at least one fluid-guiding element extending along the first axis has at least one change of direction, as a result of which it bypasses the recess at an angle to the first axis and runs along the side of the recess. The first axis can, in particular, be the transverse axis or the vertical axis but could also be another axis which runs, for example, obliquely to the transverse axis and the vertical axis. The recess extends along this axis but in a limited fashion, which means that it does not extend along the whole extent of the heat exchanger. It can be limited on one or both sides with respect to the first axis. Depending on the configuration, the recess can also be referred to as an opening, notch, cutout, depression, or the like. In one form, at least one fluid-guiding element, i.e., an end tank or an exchanger tube, extends along the first axis, wherein it can run in some areas parallel to the first axis. It has a change of direction, i.e., a kink or a curve, as a result of which the direction in which it runs changes.

By virtue of this change of direction, it bypasses the recess by running at an angle (i.e., not parallel) to the first axis. This statement refers to that part of the fluid-guiding element in which the direction in which it runs has changed such that the fluid-guiding element does not run up to the recess and instead bypasses it. In other areas, the corresponding fluid-guiding element can run parallel to the first axis. In general, the fluid-guiding element can bypass the recess obliquely to the first axis or alternatively perpendicularly or transversely to the first axis. In one form, the fluid-guiding element has not just one change of direction and instead at least two, for example in such a way that it is curved or angled in an S-shape. For example, it could run initially parallel to the first axis and then at an angle to the first axis (in order to bypass the recess as it were on the side) and finally run again parallel to the first axis. In each case, the fluid-guiding element runs along the side of the recess, which means that the recess is arranged to the side with respect to the direction in which the fluid-guiding element runs. It could also be said that the fluid-guiding element passes the recess. On an opposite side of the recess, the fluid-guiding element can have at least one further change of direction, as a result of which it can return as it were to its original course. In other words, the fluid-guiding element can circumvent the recess, whilst its course is not influenced by the presence of the latter at a certain distance before and after the recess.

The recess enables the geometry of the heat exchanger to be adapted to the local structural space and vehicle components which may adjoin it. By virtue of the change of direction of the fluid-guiding element, the fluid flow is minimally affected in some circumstances and, in any case, there is no interruption to it by the presence of the recess. The possibly complex geometry of the individual fluid-guiding element and the heat exchanger as a whole which results therefrom can be readily affected by the additive manufacturing in contrast to conventional manufacturing methods.

Apart from the change of direction, at least one fluid-guiding element can have a cross-section which changes over its extent. The basic geometry of the fluid-guiding element can here, on the one hand, be modified, for example between circular, elliptical, polygonal, and/or other shapes. Alternatively, or additionally, however, the proportions can also be modified, for example in such a way that a fluid-guiding element has a square cross-section in one area and a cross-section which corresponds to an elongated rectangle in another area. Lastly, the fluid resistance, i.e., the flow resistance for the fluid flowing through, can also be modified. For example, it can be increased by narrowing the cross-section or be reduced by enlarging the cross-section.

Optionally, air-turbulence elements can be arranged between adjacent exchanger tubes which are manufactured additively as a single piece with at least one exchanger tube. These air-turbulence elements can have a wide range of different shapes, for example the shape of fins which are oriented parallel to the longitudinal axis. The shape of the fins can be varied almost as desired, for example they can have straight, curved, and/or angled surfaces. It is, however, also possible in addition for column-like structures, which can have for example a circular, elliptical, lenticular, or polygonal, for example rectangular cross-section, to be generated by the additive manufacturing. The air-turbulence elements can also run in a different fashion with respect to the adjacent exchanger tubes. In the simplest case, they can run perpendicularly to a (local) direction in which an exchanger tube, to which they are connected as a single piece, runs. They could, however, also run at an angle other than 90°, i.e., for example obliquely. The cross-section of the air-turbulence element can also change, for example taper and/or widen out. The individual air-turbulence element can connect two exchanger tubes, i.e., be connected to both of them. Alternatively, however, it can also depart from an exchanger tube and extend toward an adjacent exchanger tube but without contacting the latter. The respective air-turbulence element has been manufactured as a single piece with the at least one exchanger tube during the additive manufacturing, i.e. it is connected to the latter by a material bond.

The heat exchanger assembly, in one form, has a vehicle component arranged at least adjacent to the recess, wherein the contour of the heat exchanger retreats from the vehicle component in the area of the recess and the recess is formed in order to at least partially receive the vehicle component. The vehicle component may or may not have a functional relation with the heat exchanger. It is arranged at least adjacent to the recess, which also includes the possibility that it is arranged at least partially in the recess. It can be in contact with the heat exchanger or be spaced apart therefrom. The recess is designed to at least partially receive the vehicle component. The vehicle component can here (in the normal state) be arranged at least partially in the recess. If this is not the case, the recess is dimensioned such that the vehicle component can be received at least partially therein. This can provide, for example in the case of an accident at low to moderate speed, that the vehicle component can move into the recess without any deformation occurring to the heat exchanger. The contour of the heat exchanger retreats from the vehicle component in the area of the recess, i.e., the recess is formed such that the heat exchanger retreats there and thus creates as it were space for the vehicle component or establishes a larger spacing from the vehicle component. By virtue of this configuration, the use of the structural space can be enhanced and the presence of the vehicle component can be accounted for by the recess without this having to affect the size or the positioning of the heat exchanger as a whole.

In particular, the vehicle component can take the form of part of a bumper assembly. Thus, it can be a bumper cross-beam which extends along the vehicle transverse axis and is arranged in front of the heat exchanger in the longitudinal direction of the vehicle. In this case, the recess can be formed as a depression in the front side of the heat exchanger which extends rearward (along the longitudinal axis). The first axis along which the recess is limited can be the transverse axis, wherein the recess extends only over a central area of the heat exchanger. One or more exchanger tubes thus bypass the recess. If the corresponding central area of the bumper cross-beam is pressed inward in the case of a certain type of frontal impact, it can move into the recess without damaging the heat exchanger. Alternatively, or additionally, a vehicle component can be an energy absorbing member via which the bumper cross-beam is connected to a chassis, normally to a longitudinal member. In this case, the recess is formed on the side (relative to the transverse axis) and extends inward from the outside along the transverse axis. The first axis along which the recess is limited can here be the vertical axis. Because, in a typical configuration, the end tanks are arranged on the side of the exchanger core, an end tank can bypass the recess. If the end tanks are arranged above and below the exchanger core, the exchanger tubes run upward and downward and at least one exchanger tube bypasses the recess on the side. It should be understood that a corresponding recess is, in one form, provided for each of the energy absorbing members arranged on both sides. The respective recess is at least large enough that the element of the bumper assembly can be received therein.

A recess for other vehicle components is, however, also conceivable. A recess for an engine hood lock could, for example, be provided in an upper area of the heat exchanger. In other words, the engine hood lock is received in the corresponding recess, whilst the heat exchanger can extend further upward to the side of the recess without affecting the function of the lock. The recess is here normally confined to the center of the heat exchanger and extends downward with respect to the vertical axis. The first axis along which the recess is limited is in this case the transverse axis, wherein normally one or more exchanger tubes bypass the recess.

A wide range of arrangements and designs of the recess are conceivable. The respective recess can extend along the longitudinal axis, the transverse axis, and/or the vertical axis. It can pass through the heat exchanger along the longitudinal axis or be limited along the longitudinal axis. Depending on the type and design of the recess, at least one fluid-guiding element can bypass a recess in the direction of the longitudinal axis, in the direction of the transverse axis, and/or in the direction of the vertical axis. Bypassing in the direction of the longitudinal axis is thus in particular conceivable when the recess does not pass through the heat exchanger. An example of this can be the above described recess for a bumper cross-beam. Bypassing in the direction of the transverse axis is in particular advantageous when the fluid-guiding element extends along the vertical axis, whilst bypassing in the direction of the vertical axis is advantageous in particular when the fluid-guiding element extends in the direction of the transverse axis.

Because the exchanger tubes in any case generally run relatively close to one another, in some circumstances an exchanger tube may contact another exchanger tube when bypassing. According to one form, it is provided that, by virtue of the change of direction, at least one exchanger tube runs up to a further exchanger tube and merges with the latter in the area of the recess. In other words, one exchanger tube approaches the other and ultimately opens out into the latter such that they form as it were a single exchanger tube. It is also possible that more than two exchanger tubes merge in this fashion. Along the first axis, on the other side of the recess, the exchanger tubes can branch out again into the original number. The corresponding structures which merge and possibly branch out again can be easily produced as part of the additive manufacturing. Where reference is made here to the exchanger tubes merging, this normally means that not only do the walls of the exchanger tubes merge but also the fluid ducts inside the exchanger tubes form a single fluid duct.

In some circumstances, merging of the exchanger tubes can be circumvented. That is, in one form, at least one exchanger tube bypasses the recess in the direction of a second axis perpendicular to the first axis and bypasses an adjacent further exchanger tube in the direction of the longitudinal axis which is perpendicular to the first and second axis. The second axis is perpendicular to the first axis and both of them are perpendicular to the longitudinal axis, i.e., one of the first and second axis is the transverse axis and the other is the vertical axis. If, for example, the exchanger tube extends along the transverse axis (which corresponds to a usual structure), it bypasses the recess in the direction of the vertical axis (i.e., above or below) and consequently comes into a position along the vertical axis which is already taken by another exchanger tube. The merging of the exchanger tubes is circumvented by the first-mentioned exchanger tube additionally bypassing in the direction of the longitudinal axis, i.e., to the rear or the front. Accordingly, the positions of the exchanger tubes coincide both along the vertical axis and along the transverse axis but are offset and normally spaced apart relative to each other along the longitudinal axis.

In another form, at least one recess is formed inside the exchanger core and passes through the latter in the direction of the longitudinal axis. The recess is formed inside the exchanger core, which means that it is limited both along the vertical axis and along the transverse axis on both sides of the exchanger core. If the exchanger tubes extend along the transverse axis, they bypass the recess on both sides in the direction of the vertical axis (i.e., above and below). If the exchanger tubes extend along the vertical axis, they accordingly bypass in the direction of the transverse axis. Additionally, bypassing along the longitudinal axis is optionally conceivable, as described above. Such an internally situated recess can serve, for example, to receive a sensor unit.

As already mentioned, additive manufacturing enables any desired shape for the fluid-guiding elements. This can also be used, for example, to eliminate individual areas which can cause an undesired increase in the flow resistance in conventionally produced heat exchangers. Such an area can, in particular, be a transition area from an end tank to an exchanger tube. Because they can be manufactured additively together in the case of the heat exchanger assembly according to the disclosure, an abrupt transition in the form of an edge or a kink can be circumvented. In one form, contours of an end tank and an exchanger tube merge into each other in a curve. In other words, there is as it were a gentle transition from the end tank to the exchanger tube and vice versa. As a result, turbulence which generally occurs can be reduced. It should be understood that such a curving transition between an end tank and a plurality of exchanger tubes (or all the exchanger tubes connected thereto) is possible.

According to another form, a projection projecting transversely to the first axis is formed adjacent to the recess, wherein at least one fluid-guiding element extending along the first axis has at least one change of direction by virtue of which it runs into the projection at an angle to the first axis. The projection or projecting area of the heat exchanger is formed adjacent to the recess. It extends transversely to the first axis, i.e., it projects transversely to the first axis. It is, in particular, possible that the recess is limited by the projection along the first axis. It is also possible that the recess is formed along the first axis between two such projections. In order to increase the use of the projection for heat exchange, a change of direction of at least one fluid-guiding element is generally desired. By virtue of the change of direction, the latter runs into the projection at an angle to the first axis. By virtue of a further change of direction, it can run parallel to the first axis inside the projection or can run out of the projection again.

In the case of modern motor vehicles, a single heat exchanger is, in one form, not provided and, instead, a plurality of heat exchangers which are grouped together in a heat exchanger bundle. Whilst it is desired that the individual heat exchangers exchange heat with the ambient air, direct heat exchange between two heat exchangers is normally counterproductive and undesired. In one form, the heat exchanger assembly has at least two heat exchangers which are connected by at least one additively manufactured, thermally insulating connecting element to form a heat exchanger bundle. The thermally insulating connecting element can form, for example, an insulating layer between the heat exchangers and/or it can form a bracket on the edge for the two heat exchangers. It is configured so that it is thermally insulating, which means that its thermal conductivity is less than that of the heat exchangers, in particular that of the exchanger tubes. Whilst the latter are, in one form, manufactured from metal, the connecting element can be manufactured, for example, from plastic. It can be produced in an additive method such as, for example, fused deposition modeling (FDM) and be printed, for example, directly onto the two heat exchangers. The connecting element can also have mounting structures (for example, recesses for pins, screws, etc.) which serve to fasten the heat exchanger bundle on the vehicle body.

Further areas of applicability will become apparent from the description provided herein. It should be understood that the description and specific examples are intended for purposes of illustration only and are not intended to limit the scope of the present disclosure.

DRAWINGS

Further advantageous details and effects of the disclosure are explained in more detail below on the basis of exemplary embodiments illustrated in the figures, in which.

Figure 1:
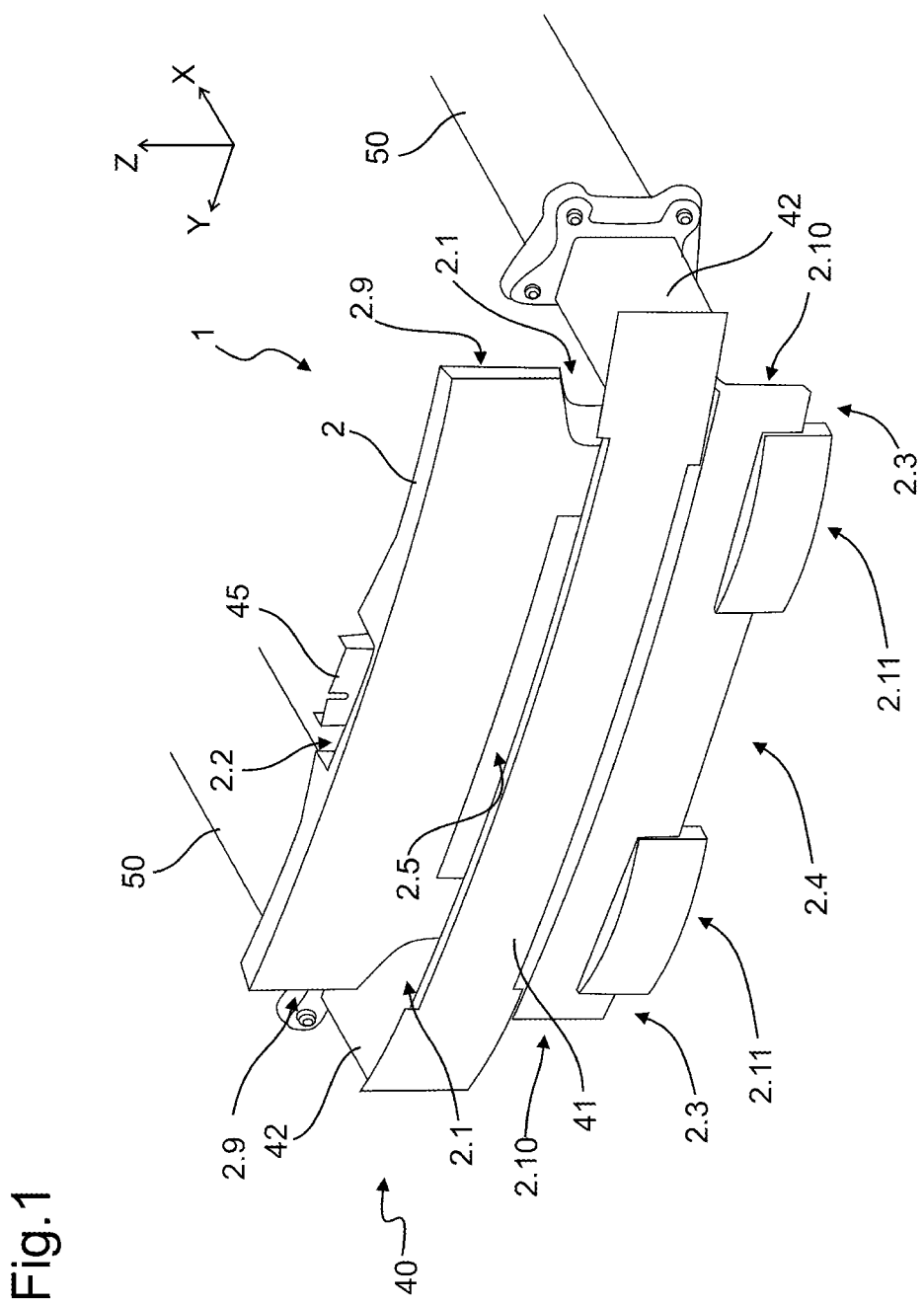
FIG. 1 is a perspective front view of parts of a motor vehicle including a heat exchanger according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the different figures, identical parts are always provided with the same reference signs, for which reason these parts are generally also described only once.

Figure 2:
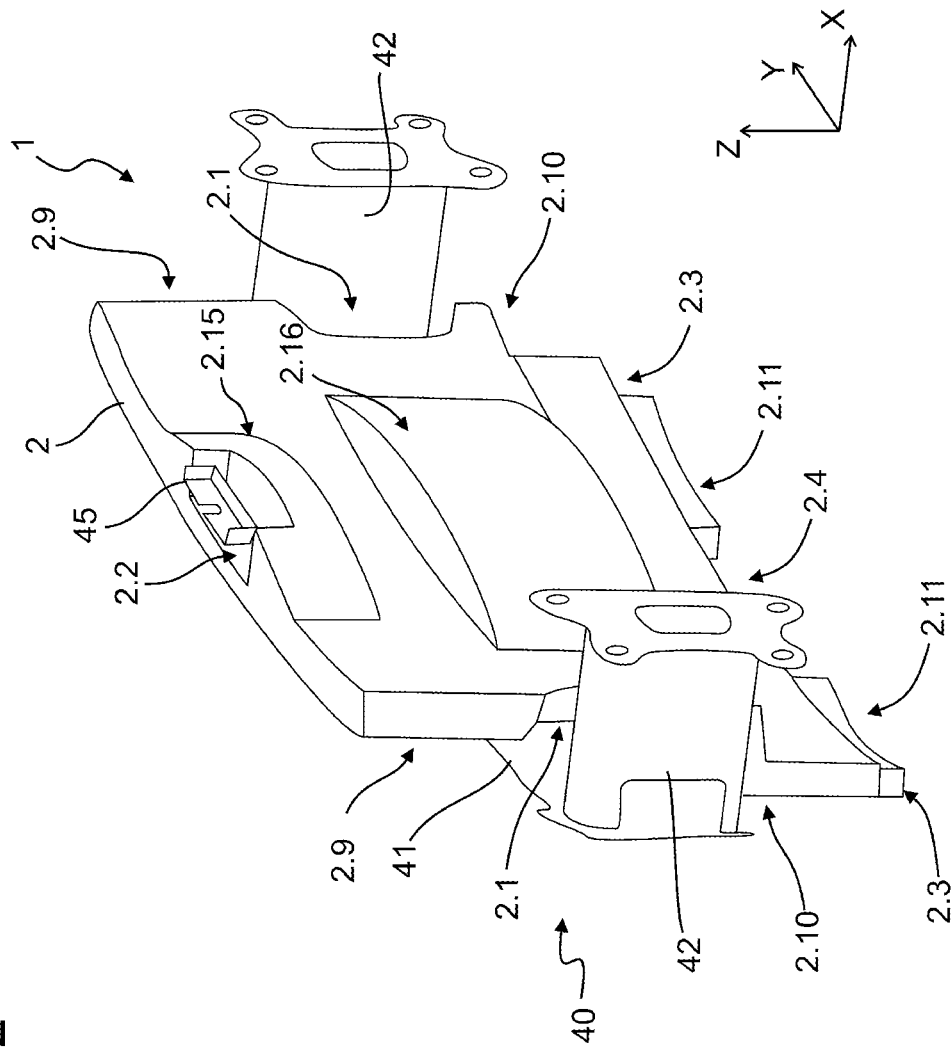
FIG. 2 is a perspective rear view of the heat exchanger of FIG. 1.

FIGS. 1-7 show one example of a heat exchanger assembly 1 according to the present disclosure for a motor vehicle, for example a car. A heat exchanger 2 is arranged in the front area of the motor vehicle, wherein it can be arranged along a longitudinal axis X behind a front panel (not shown) which has one or more air-inlet openings. The heat exchanger 2 has two end tanks or tubes 3 (FIGS. 3-6) for a heat-exchange medium or fluid (not illustrated here), for example a coolant of the motor vehicle, one of which serves as an inlet tank and the other as an outlet tank. The end tanks 3 extend along a vertical axis Z and are connected to each other by exchanger tubes 4-7 (FIG. 3) of an exchanger core 11. Each of the exchanger tubes 4-7 has a hollow design and has a fluid passage path for guiding the fluid. The exchanger tubes 4-7 extend along a transverse axis Y. For the sake of clarity, only the outer structure of the heat exchanger 2 is illustrated in FIGS. 1 and 2, whilst the end tanks 3 and the exchanger tubes 4-7 which form fluid-guiding elements are illustrated only in FIGS. 3-7. The whole of the heat exchanger 2 is manufactured from an aluminium alloy by an additive manufacturing method, for example by a powder bed method such as SLM or by liquid metal printing. The additive manufacturing method allows efficient manufacture even of complex three-dimensional structures.

The heat exchanger assembly 1 has, apart from the heat exchanger 2, a bumper assembly 40 with a bumper cross-beam 41 extending along the transverse axis Y and two energy absorbing members 42 extending along the longitudinal axis X which are connected to longitudinal members 50 of a chassis (not shown) of the motor vehicle.

The heat exchanger 2 extends both along the transverse axis Y and along the vertical axis Z, whilst it is designed as relatively thin along the longitudinal axis X. As a whole, it does not run parallel to the transverse axis Y and instead has a predominantly slightly curved shape, as can be seen from the illustrations in section in FIGS. 4-7. Its overall shape deviates from the rectangular, wherein it has a plurality of recesses 2.1-2.5 and a plurality of projections 2.9-2.11. First recesses 2.1, which are arranged at the level of the energy absorbing members 42 relative to the vertical axis Z, are formed on both sides along the transverse axis Y. They are thus dimensioned such that in each case one energy absorbing member 42 and/or cross-beam 41 can be partially received in a first recess 2.1 or even larger. Thus, in the case of a certain type of frontal impact, the energy absorbing members can deform to a certain degree without engaging with the heat exchanger 2.

First projections 2.9 are formed above the first recesses 2.1 and second projections 2.10 below the latter. A second recess 2.2 in which an engine hood lock 45 is arranged is formed on an upper side. Third projections 2.11 which are flanked on the outside by third recesses 2.3 are formed on the underside, whilst a fourth recess 2.4 is formed between them. The third and fourth recesses 2.3, 2.4 can form free structural space for further vehicle components which are not illustrated here, whilst the third projections 2.11 can make use of locally existing structural space or, for example, a local air flow. A fifth recess 2.5 formed in the manner of a depression, which extends concavely over part of the width of the heat exchanger 2, is formed on the front side of the heat exchanger 1 (FIG. 1). It is arranged at the level of the bumper cross-beam 41 and formed such that it can be received at least partially in the fifth recess 2.5 in the case of deformation caused by a certain type of frontal impact without engaging with the heat exchanger 2. In order to provide an increased fluid flow in spite of the configuration of the heat exchanger 2 with a shape that deviates from the rectangular or square, the fluid-guiding elements 3-7 have to be configured in a particular way, as will now be explained with reference to FIGS. 3-7.

Each of the end tanks 3 runs in the area of the first projections 2.9 parallel to the vertical axis Z and furthermore has a first change of direction 3.1 (FIG. 3; a curve), after which it runs at an angle to the vertical axis Z and hence bypasses the first recess 2.1 along the transverse axis Y toward the center of the vehicle. It then runs, after a second change of direction 3.2 (FIG. 3), again parallel to the vertical axis Z along the side of the first recess 2.1. After a third change of direction 3.3 (FIG. 3), it runs again at an angle to the vertical axis Z into the second projection 2.10. After a fourth change of direction 3.4 (FIG. 3), it runs again parallel to the vertical axis Z.

Figure 3:
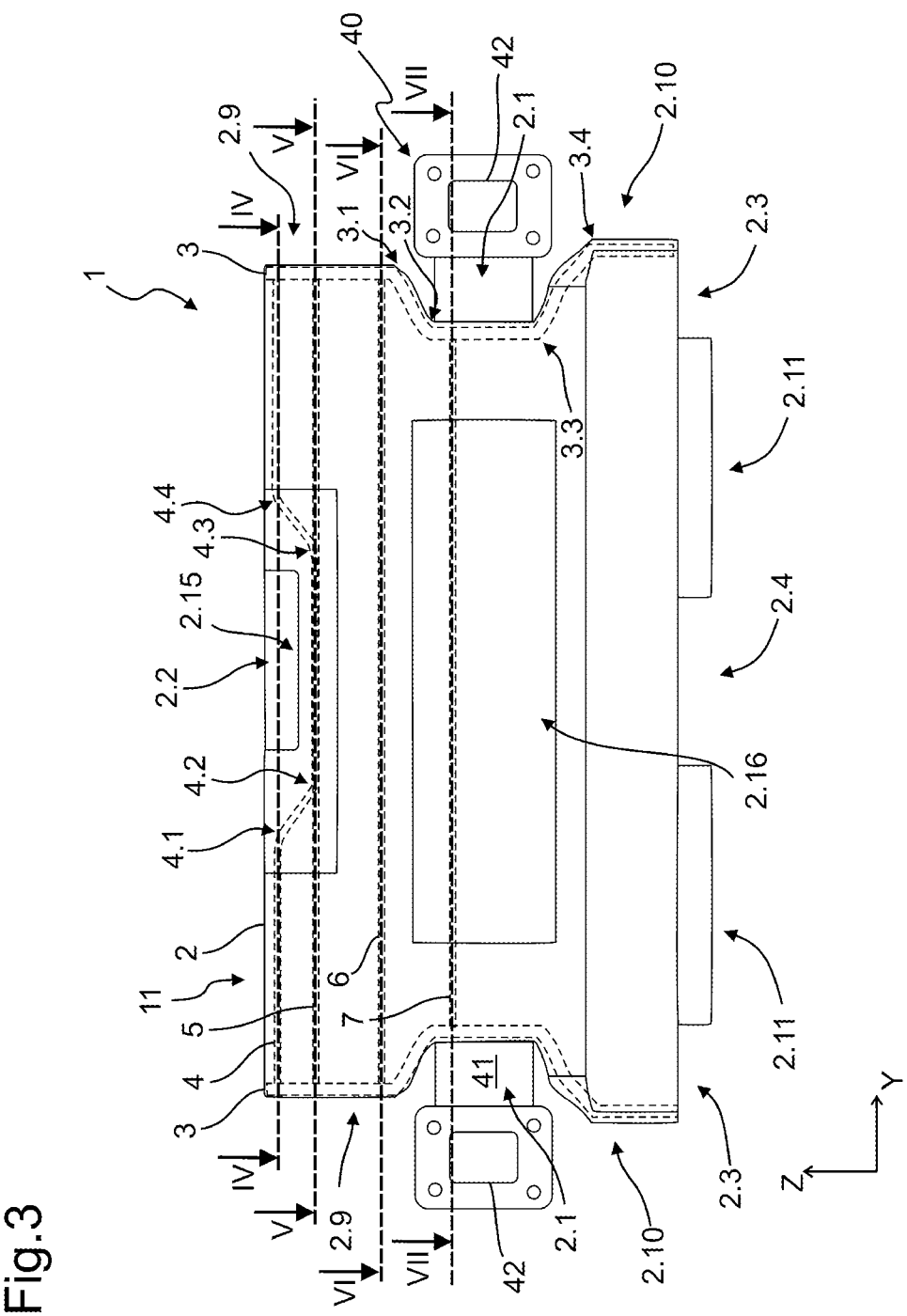
FIG. 3 is a rear view of the heat exchanger of FIG. 1.
Figure 4:
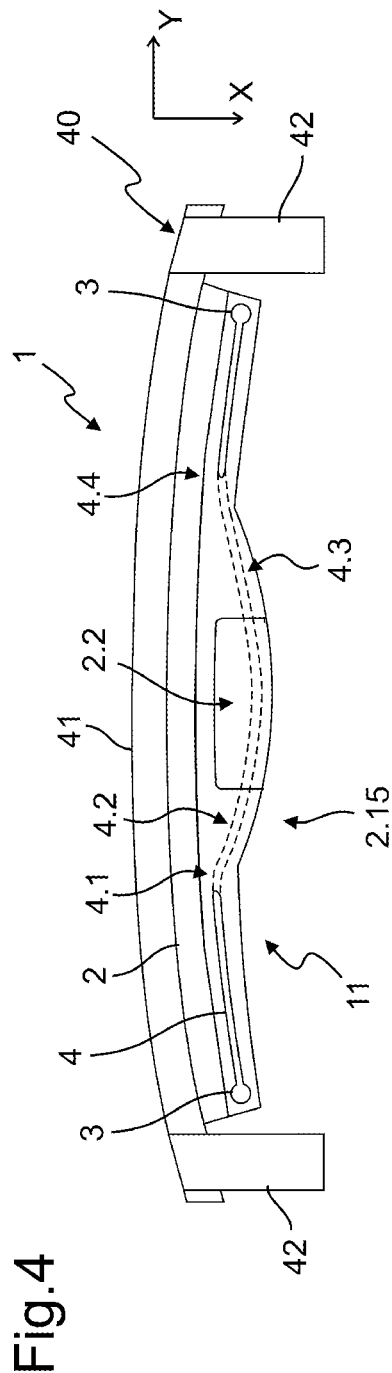
FIG. 4 is a cross-sectional view of the heat exchanger of FIG. 1, taken along the line IV-IV of FIG. 3.

Whilst the heat exchanger 2 actually has a plurality of exchanger tubes 4-7, which connect the end tanks 3, for the sake of clarity only four exchanger tubes 4-7 are illustrated in FIG. 3 by way of example. A first exchanger tube 4 arranged close to the upper side of the heat exchanger 2 runs, departing from the respective end tank 3, initially horizontally before it makes a first change of direction 4.1, as a result of which it bypasses the second recess 2.2, below it in the direction of the vertical axis. However, at the same time it also bypasses a second exchanger tube 5, running below it, behind it along the longitudinal axis X (FIGS. 3 and 4; a portion of the first exchanger tube 4 runs below the second exchanger tube 5 and is located closer toward the rear of the motor vehicle compared to the second exchanger tube 5). In order to create space for the bypassing first exchanger tube 4 (and further exchanger tubes not illustrated here), the heat exchanger 2 is lengthened locally along the longitudinal axis X and forms a first bulged area 2.15 (FIGS. 1, 3 and 4). Inside the latter, the first exchanger tube 4 runs, after a second change of direction 4.2, again horizontally before, on the other side of the second recess 2.2, by virtue of a third change of direction 4.3 it again runs obliquely upward and, after a fourth change of direction 4.4, again runs horizontally at the original height and opens into the opposite end tank 3.

Figure 5:
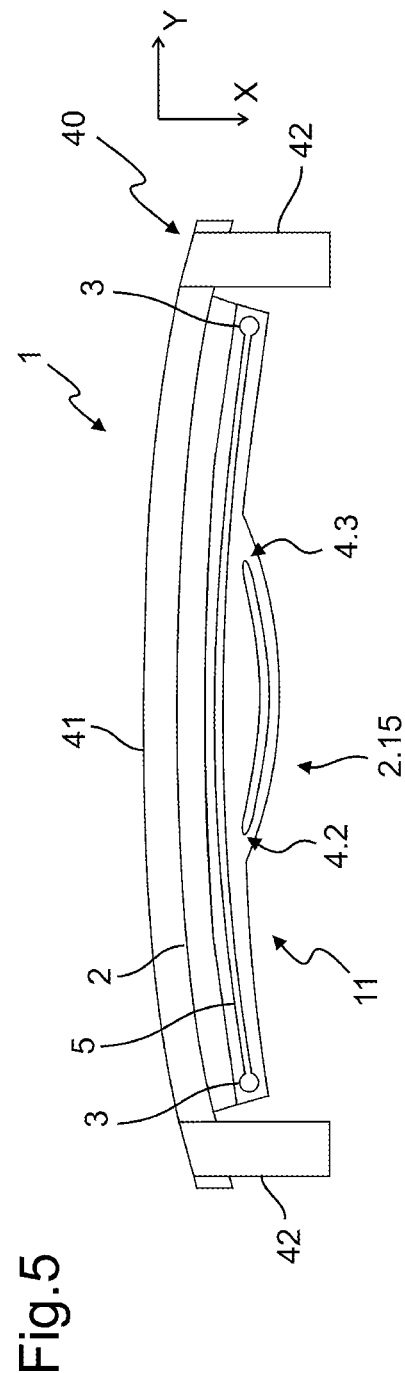
FIG. 5 is a cross-sectional view of the heat exchanger of FIG. 1, taken along the line V-V of FIG. 3.
Figure 6:
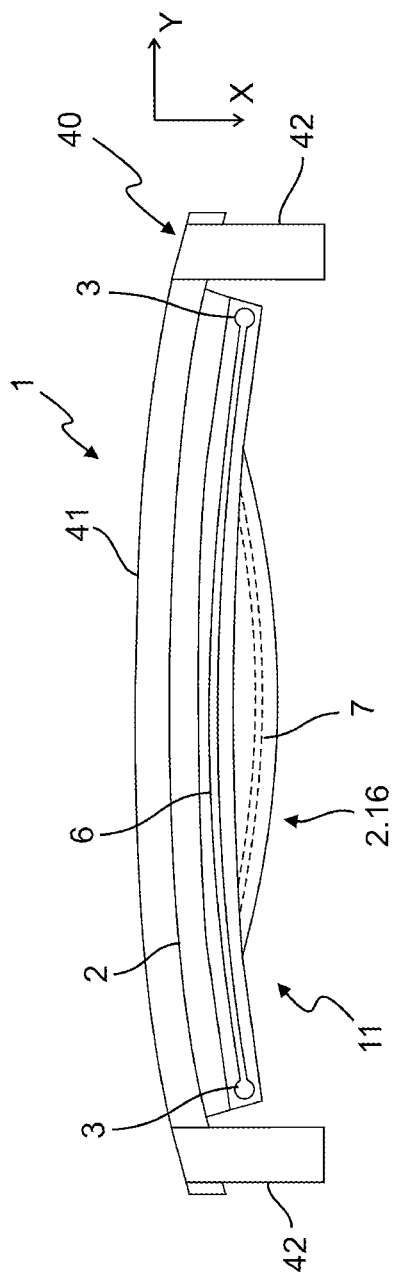
FIG. 6 is a cross-sectional view of the heat exchanger of FIG. 1, taken along the line VI-VI of FIG. 3.
Figure 7:
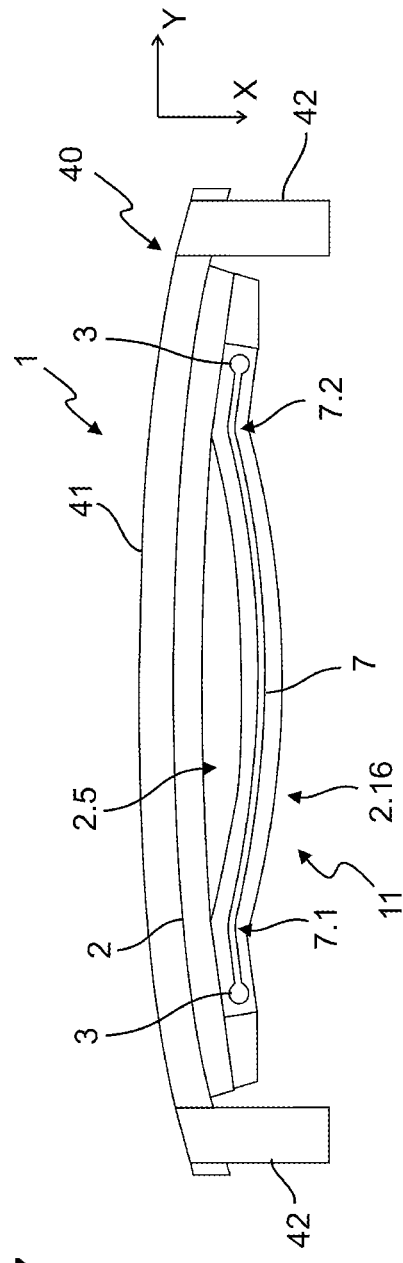
FIG. 7 is a cross-sectional view of the heat exchanger of FIG. 1, taken along the line VII-VII of FIG. 3.

As illustrated in FIG. 5, the second exchanger tube 5 running as a whole below the second recess 2.2, is slightly curved according to the shape of the heat exchanger 2 but otherwise runs continuously horizontally with no (significant) change of direction. The same also applies for a third exchanger tube 6 (FIG. 7) running further below the second recess 2.2 but above the fifth recess 2.5. A fourth exchanger tube 7 shown here by way of example runs at the level of the fifth recess 2.5. In order to make enough space available for the fourth exchanger tube 7 (and further exchanger tubes not illustrated here), the heat exchanger 2 has, in the direction of the longitudinal axis X relative to the fifth recess 2.5, a second bulged area 2.16 (FIGS. 2, 3, 6, and 7) which bulges out rearward. As can be clearly seen in FIG. 7, the fourth exchanger tube 7 runs, departing from the end tank 3, initially approximately parallel to the transverse axis Y before it changes direction by virtue of a first change of direction 7.1 in order to bypass the fifth recess 2.5. It furthermore runs following the shape of the second bulged section 2.16, before it changes direction again on an opposite side of the fifth recess 2.5 corresponding to a second change of direction 7.2, and runs almost parallel to the transverse axis Y to the other end tank 3.

The course of further exchanger tubes which are not illustrated here can also be adapted to the arrangement of the third and fourth recess 2.3, 2.4 and the third projections 2.11. As a whole, the shape of the fluid-guiding elements 3-7 is therefore adapted to the end tanks 3 and to the exchanger tubes 4-7 such that they in each case bypass the recesses 2.1-2.5 but also run through the projections 2.9-2.11 and thus supply them with fluid and increase the use the structural space provided by them.

Figure 8:
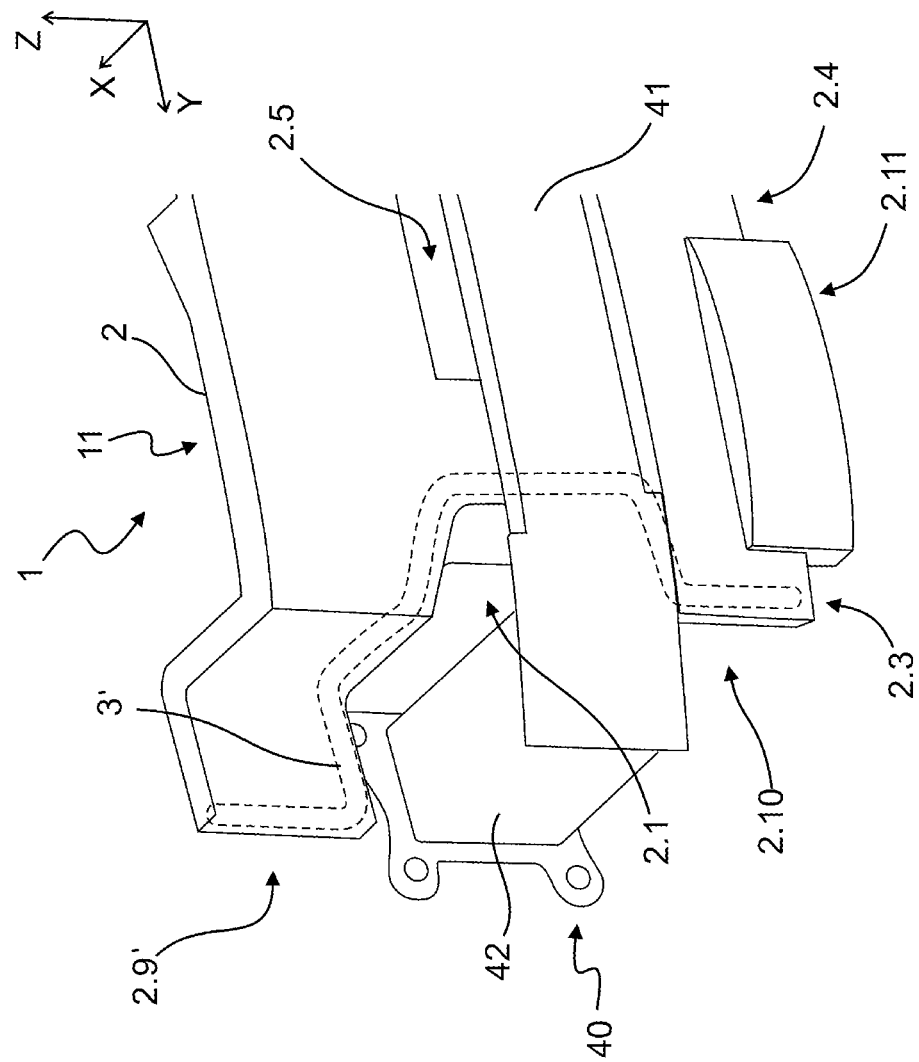
FIG. 8 is a perspective front view of a portion of another heat exchanger according to the principles of the present disclosure.

FIG. 8 shows a further form of a heat exchanger assembly 1 according to the disclosure which is largely identical to the above described form in FIGS. 1-7 and to this extent is not explained again, except for differences. That is, in the form shown in FIG. 8, first projection 2.9' here extends further outward with respect to the transverse axis Y and moreover is offset rearward with respect to the longitudinal axis X. An even more complicated course of the end tank 3' correspondingly results.

Figure 9:
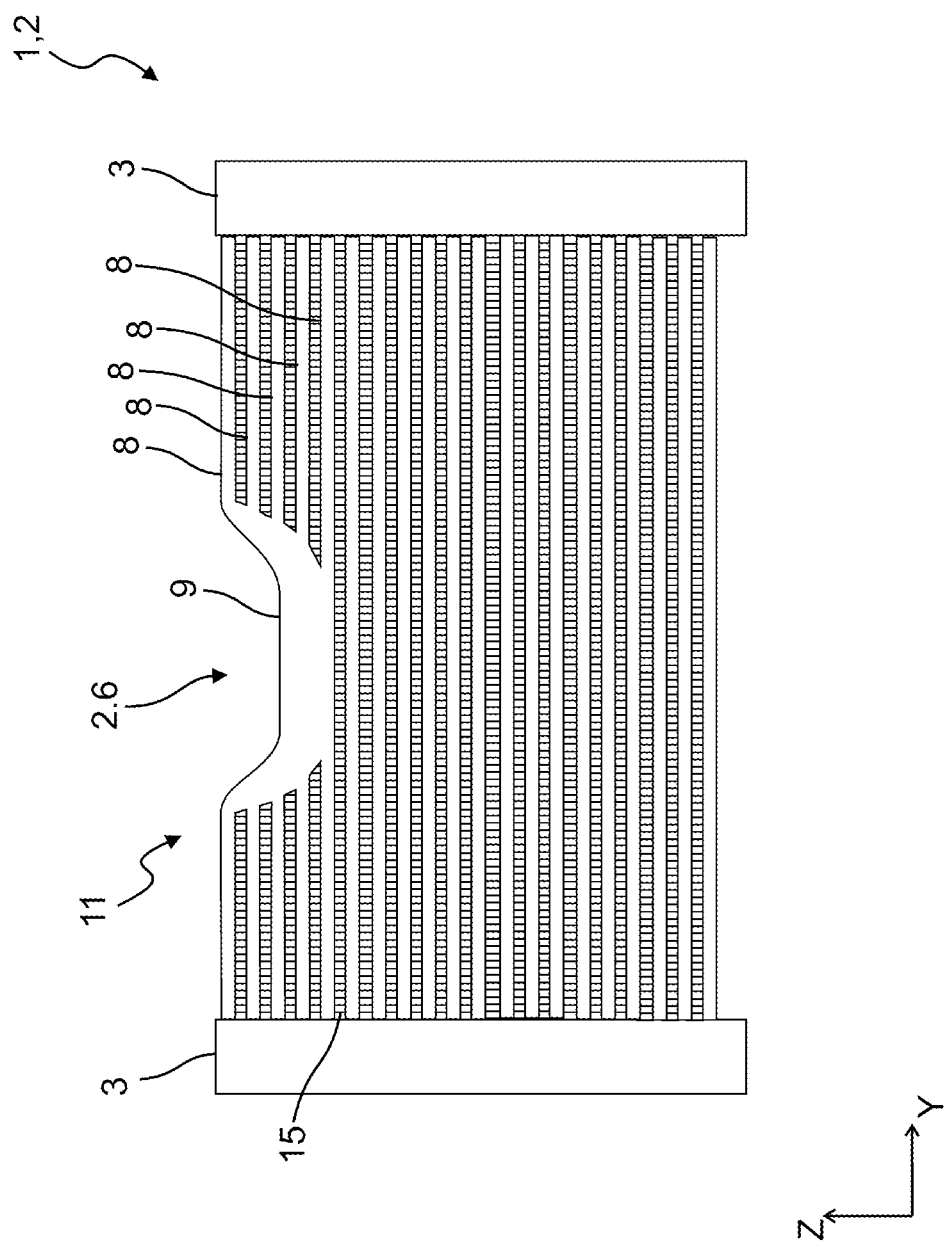
FIG. 9 is a rear view of another heat exchanger according to the principles of the present disclosure.

FIG. 9 shows a further form of a heat exchanger assembly 1 according to the disclosure, wherein in this case only the heat exchanger 2 is illustrated. In this form, the heat exchanger 2 has a rectangular cross-section, wherein the end tanks 3 extend parallel to the vertical axis Z and most of the exchanger tubes 8 run parallel to the transverse axis Y. In order, on the one hand, to enlarge the surface of the exchanger core 11 and, on the other hand, to influence the flow of the air, air-turbulence elements 15 which here extend parallel to the vertical axis Z are in each case arranged between adjacent exchanger tubes 8. Such air-turbulence elements 15 can also be present in the other exemplary forms but are not illustrated for the sake of clarity. In this form, a recess 2.6, which can be provided for an engine hood lock as in the form shown above in FIGS. 1-7, is formed in the upper area. A plurality of exchanger tubes 8 again have a change of direction in order to bypass the recess 2.6 below it in the direction of the vertical axis Z. However, each of the upper exchanger tubes 8 do not bypass the lower exchanger tubes 8 along the longitudinal axis X and instead each upper exchanger tube 8 runs up to the exchanger tube 8 situated below it and merges with the latter such that, in the area of the recess 2.6, a single exchanger tube 9 with an enlarged cross-section is formed from five individual exchanger tubes 8.

Figure 10:
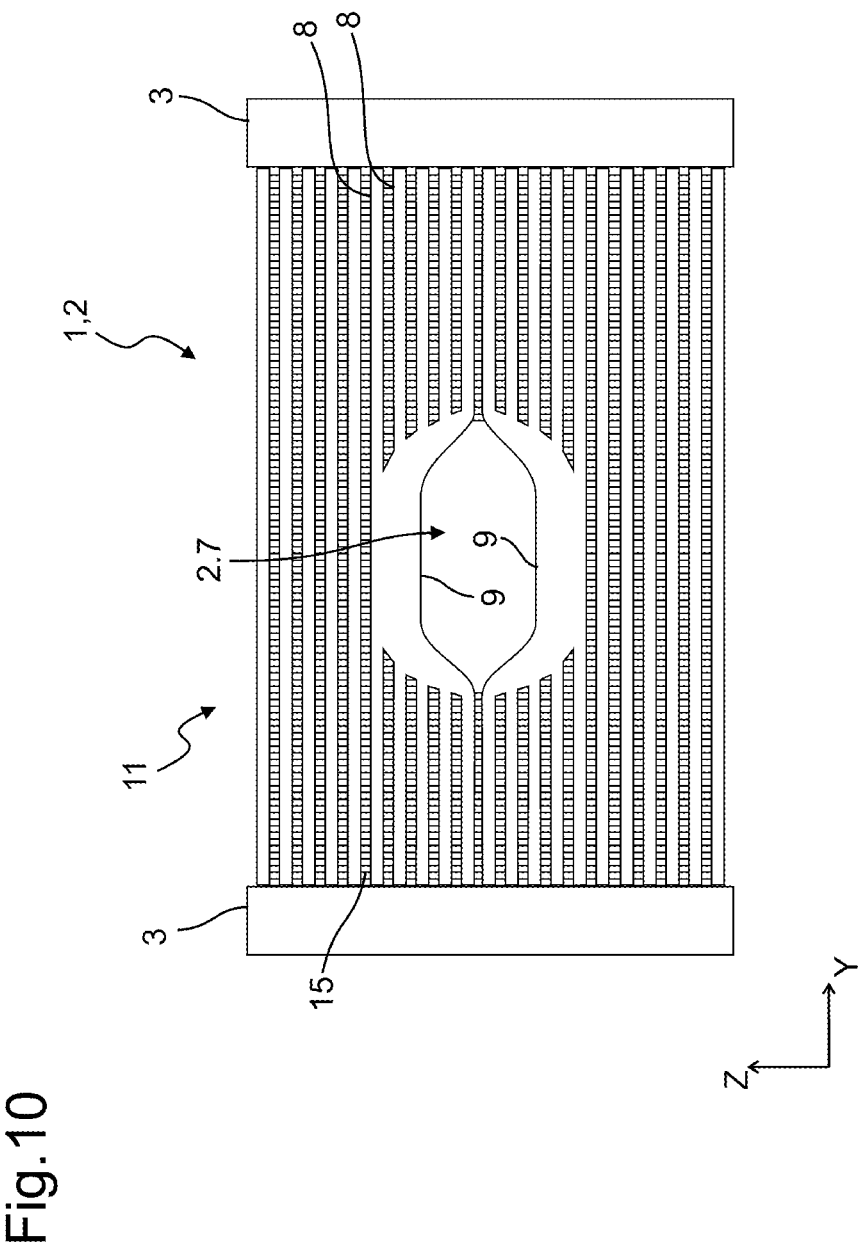
FIG. 10 is a rear view of another heat exchanger according to the principles of the present disclosure.

In yet another form, a heat exchanger assembly 1 according to the disclosure illustrated in FIG. 10 follows a similar principle, wherein again only the heat exchanger 2 is illustrated. In this case, however, a recess 2.7 is provided in the interior of the exchanger core and runs completely through the latter along the longitudinal axis X. It is enclosed on both sides of the exchanger core 11 both along the transverse axis Y and along the vertical axis Z. In each case, five exchanger tubes 8 merge above the recess 2.7 and below the latter to form a single exchanger tube 9 with an enlarged cross-section. The recess 2.7 formed in this way can provide, for example, structural space for sensors in the front area of the motor vehicle.

Figure 12:
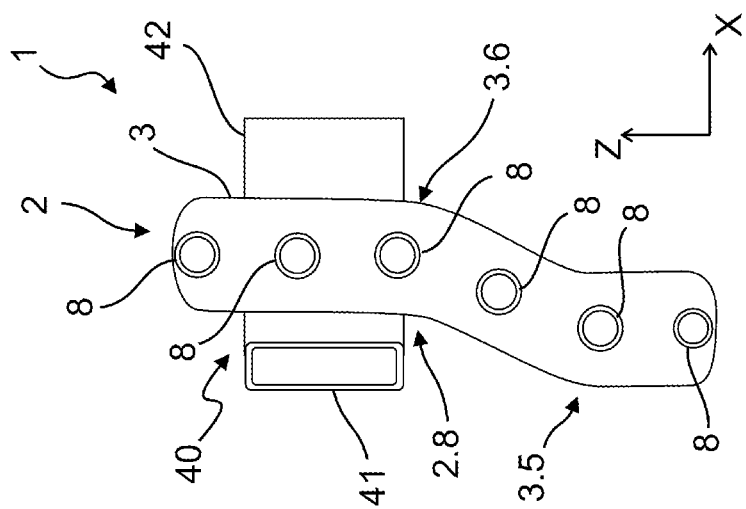
FIG. 12 is a cross-sectional view along the line XII-XII of FIG. 11.
Figure 11:
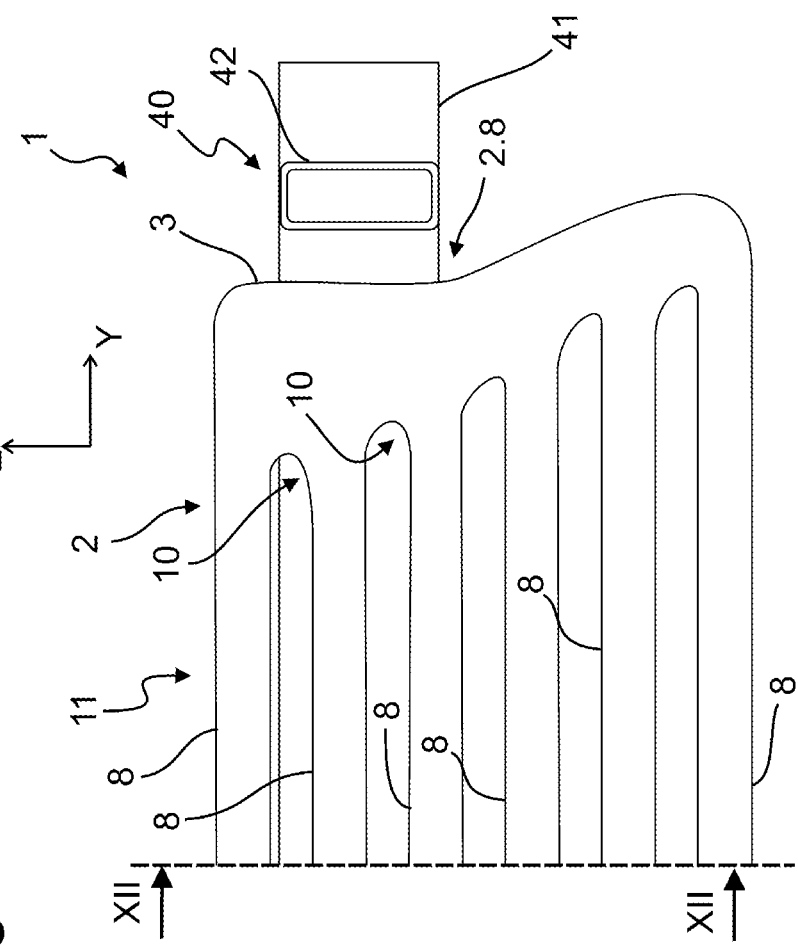
FIG. 11 is a rear view of a portion of another heat exchanger according to the principles of the present disclosure.

FIGS. 11 and 12 show another form of a heat exchanger assembly 1 according to the disclosure which again has a bumper assembly 40. The end tank 3 runs along the vertical axis Z but it has two changes of direction 3.5, 3.6 in order to bypass a recess 2.8 in which the bumper assembly 40 is partially received. In order to increase the flow resistance and provide a better fluid flow, the end tank 3 has, on the one hand, a cross-section which is enlarged upward along the vertical axis Z, wherein a connecting line, not illustrated here, to other parts of the heat circuit is provided in the upper part of the end tank 3. On the other hand, the contour of each of the exchanger tubes 8 transitions in a transition area 10 in each case in a curve into the contour of the end tank 3, i.e., there is no edge and no kink at this point which could undesirably promote the turbulence.

Figure 13:
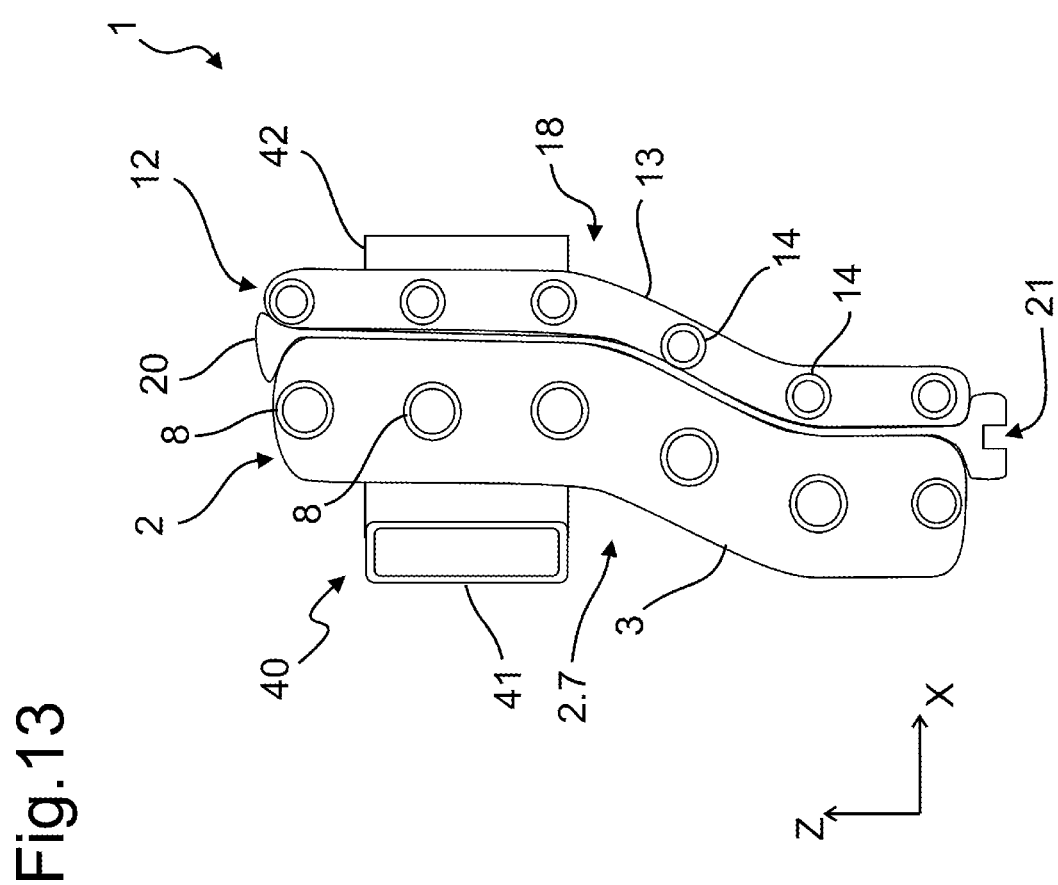
FIG. 13 is a cross-sectional view of another heat exchanger according to the principles of the present disclosure.

FIG. 13 shows yet another form of a heat exchanger assembly 1 according to the present disclosure, wherein the illustration corresponds to FIG. 12 and the form of the described heat exchanger 2 in FIG. 13 corresponds to the form described in FIG. 12. However, in this case, a second heat exchanger 12 is provided which has end tanks 3, 13 and exchanger tubes 14 connecting them. The end tanks 3, 13 are arranged adjacent to each other along the longitudinal axis X, wherein however a plastic connecting element 20 is interposed. The latter can be printed in an additive method such as FDM on or between the two heat exchangers 2, 12 after they have first been manufactured additively. The connecting element 20 which is illustrated here in simplified fashion serves, on the one hand, to mechanically connect the two heat exchangers 2, 12, as a result of which they form a heat exchanger bundle 18 and, on the other hand, it can serve to connect the heat exchanger bundle 18 to a vehicle body, for example to the chassis. For this purpose, it can have mounting structures 21, one of which is illustrated here schematically as a recess in which, for example, a pin or a screw could be received.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A heat exchanger assembly for a motor vehicle, the heat exchanger assembly comprising:
   at least one heat exchanger formed by additive manufacturing and including at least two end tanks and a plurality of exchanger tubes formed therein, the plurality of exchanger tubes extending in a transverse direction relative to a longitudinal direction of the motor vehicle and connecting the at least two end tanks to each other such that fluid is allowed to flow between the at least two end tanks by the plurality of exchanger tubes,
   wherein the at least one heat exchanger has a first recess formed therein, wherein a first exchanger tube of the plurality of exchanger tubes has at least one change of direction such that the first exchanger tube bypasses the first recess at an angle to the transverse direction and runs along a side of the first recess.

2. The heat exchanger assembly according to claim 1, further comprising a vehicle component at least partially received in the first recess.

3. The heat exchanger assembly according to claim 2, wherein the vehicle component is an engine hood lock.

4. The heat exchanger assembly according to claim 1, wherein:
   the at least one heat exchanger has a second recess formed therein; and
   the plurality of exchanger tubes includes a second exchanger tube that has at least one change of direction such that the second exchanger tube bypasses the second recess at an angle to the transverse direction.

5. The heat exchanger assembly according to claim 1, wherein the first exchanger tube runs up to a second exchanger tube of the plurality of exchanger tubes and merges with the second exchanger tube in an area of the first recess.

6. The heat exchanger assembly according to claim 1, wherein the first exchanger tube bypasses a second exchanger tube of the plurality of exchanger tubes in the longitudinal direction.

7. The heat exchanger assembly according to claim 6, wherein the first exchanger tube is located above the second exchanger tube.

8. The heat exchanger assembly according to claim 6, wherein the second exchanger tube extends continuously in the transverse direction.

9. The heat exchanger assembly according to claim 1, wherein contours of each of the at least two end tanks and at least one exchanger tube of the plurality of exchanger tubes transition into each other in a curve.

10. The heat exchanger assembly according to claim 1, wherein the at least one heat exchanger includes at least two heat exchangers which are connected by at least one additively manufactured, thermally insulating connecting element to form a heat exchanger bundle.

11. A heat exchanger assembly for a motor vehicle, the heat exchanger assembly comprising:
    at least one heat exchanger formed by additive manufacturing and including two end tanks and a plurality of exchanger tubes, the plurality of exchanger tubes extending in a transverse direction relative to a longitudinal direction of the motor vehicle and connecting the two end tanks to each other such that fluid is allowed to flow between the two end tanks by the plurality of exchanger tubes,
    wherein the at least one heat exchanger has a first recess and a second recess formed therein, wherein a first exchanger tube of the plurality of exchanger tubes extends along the transverse direction and has at least one change of direction such that the first exchanger tube bypasses the first recess at a first angle to the transverse direction and runs along a first side of the first recess, and
    wherein one end tank of the two end tanks extends along a vertical direction of the motor vehicle and has at least one change of direction such that the one end tank bypasses the second recess at a second angle to the vertical direction and runs along a second side of the second recess.

12. The heat exchanger assembly according to claim 11, further comprising a vehicle component at least partially received in the first recess.

13. The heat exchanger assembly according to claim 12, wherein the vehicle component is an engine hood lock.

14. The heat exchanger assembly according to claim 11, further comprising a vehicle component at least partially received in the second recess.

15. The heat exchanger assembly according to claim 14, wherein the vehicle component is a bumper.

16. The heat exchanger assembly according to claim 11, wherein the first exchanger tube runs up to a second exchanger tube of the plurality of exchanger tubes and merges with the second exchanger tube in an area of the first recess.

17. The heat exchanger assembly according to claim 11, wherein the first exchanger tube bypasses a second exchanger tube of the plurality of exchanger tubes in the longitudinal direction.

18. The heat exchanger assembly according to claim 17, wherein the first exchanger tube is located above the second exchanger tube.

19. The heat exchanger assembly according to claim 17, wherein the second exchanger tube extends continuously in the transverse direction.

20. The heat exchanger assembly according to claim 11, wherein the at least one heat exchanger includes at least two heat exchangers which are connected by at least one additively manufactured, thermally insulating connecting element to form a heat exchanger bundle.

* * * * *